Feb. 27, 1923. 1,446,561.
J. HARRIS.
WHEEL.
FILED MAY 29, 1918.
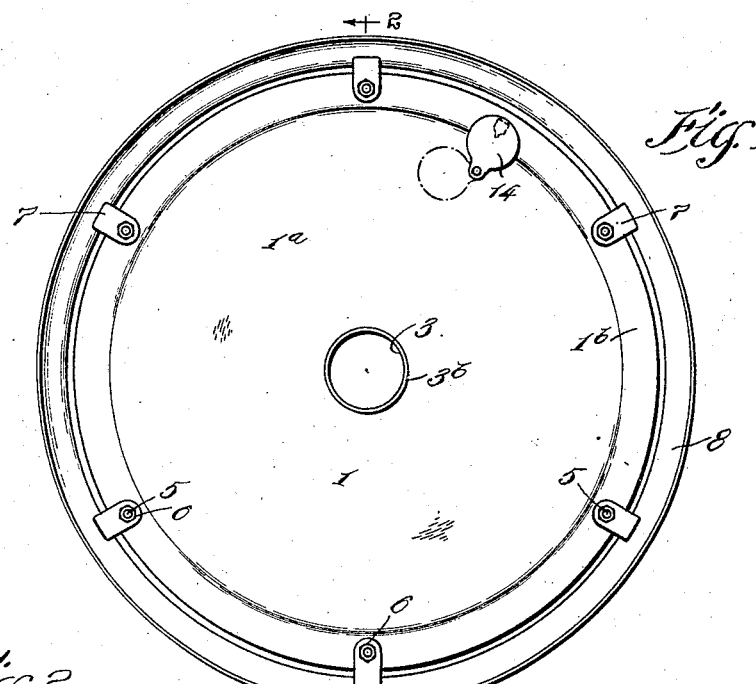
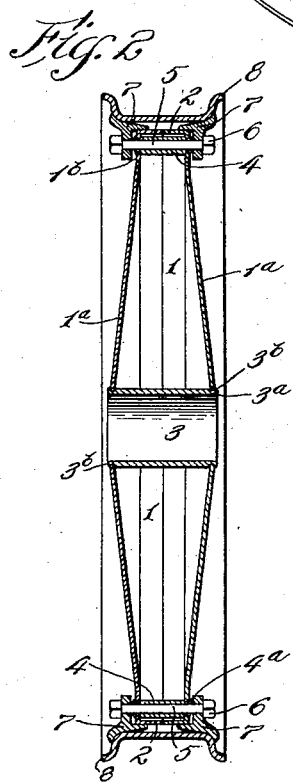
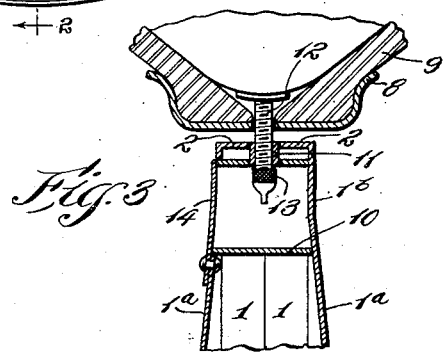
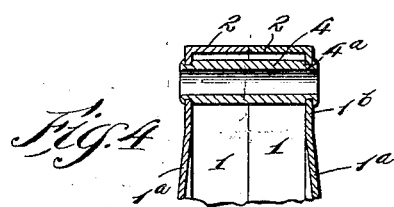

Patented Feb. 27, 1923.

1,446,561

UNITED STATES PATENT OFFICE.

JOHN HARRIS, OF LAKEWOOD, OHIO, ASSIGNOR OF ONE-HALF TO JAMES R. ROSE, OF EDGEWORTH, PENNSYLVANIA.

WHEEL.

Application filed May 29, 1918. Serial No. 237,219.

*To all whom it may concern:*

Be it known that I, JOHN HARRIS, a citizen of the United States, residing at Lakewood, in the county of Cuyahoga and State of Ohio, have invented a certain new and useful Improvement in Wheels, of which the following is a full, clear, and exact description, reference being had to the accompanying drawings.

This invention relates to vehicle wheels, and more particularly to wheels of the disk type. It is the general object of the invention to provide a wheel of this character which may be conveniently and economically produced from two metal disks and which, when assembled, will prevent access of moisture to and the consequent rusting of the interior of the said wheel. Further and more limited objects of the invention will be set forth hereinafter and will be realized in and through the combinations of elements and parts embodied in the claims hereto annexed.

In the drawings, Fig. 1 represents an elevation of the inner side of a wheel constructed in accordance with my invention; Fig. 2 a central sectional view taken through such wheel; and Figs. 3 and 4 sectional details of the rim section of the said wheel.

The wheel illustrated and described herein comprises generally a pair of symmetrical sheet metal disks each having a peripheral flange, said flanges jointly forming a fixed rim or felly, a central hub sleeve forming a fluid-tight connection with said disks, a suitable number of sleeves adjacent to and located radially within the rim flanges and forming each a fluid-tight connection with the disks and providing each an enclosure for one of the clip bolts for a demountable rim, and a fluid-tight connection for receiving the valve stem of a tire and permitting access thereto.

Describing the parts by reference numerals, 1 denotes each of a pair of symmetrical disks, preferably of sheet metal, and each having a cylindrical flange 2, said flanges forming jointly a fixed rim for the wheel, the disks being united by welding the meeting edges of said flanges together, as by means of a torch-welding machine. The disks are provided at their respective centers with registering circular openings for the reception of a tubular hub sleeve 3. This sleeve is reduced at its ends—see 3ª—as by swaging, to provide a shouldered seat for the inner edges of the walls of such disk openings, the outer reduced ends of the sleeve being forced against the outer edges of such walls, as indicated at 3$^b$, and preferably being torch welded thereto to provide a fluid-tight connection between the hub sleeve and the disks. Each disk is bulged outwardly at the central portion, providing a frusto-conical surface 1$^a$ extending from the hub sleeve nearly to the rim flange, the outer portion 1$^b$ of each disk being substantially flat—that is to say, the portions 1$^b$ are normal to the axis of the wheel while the portions 1$^a$ are slightly inclined with respect thereto.

Immediately within the flanges 2, the disks are provided with registering circular openings for the reception of sleeves 4, smaller than but constructed similarly to the hub sleeve 3 and each having a reduced outer end 4$^a$ whereby a shoulder is provided for the inner edge of the wall surrounding the appropriate peripheral opening, the ends of each tube being forced against the outer edges of the walls of their respective disk openings and preferably torch-welded thereto. The sleeves 4 are for the reception of the clip bolts 5, said bolts being inserted into said sleeves and, by setting up on the nuts 6, serving to draw the beveled clips 7 to their seats upon the fixed rim and thereby clamp and support the demountable rim 8 in the usual manner.

In order to receive the valve stem of a tire 9 and provide a means of convenient access to the end thereof for purposes of inflation, a sleeve 10 is welded to the inner disk, adjacent to the peripheral flange 2 thereof. This sleeve is preferably of such length as to extend entirely across the space between the two disks and abut against the inner face of the outer disk when the said disks are assembled. Projecting radially from the outer central portion of the sleeve 10 is a smaller sleeve 11, which is preferably welded to the wall of a circular opening formed in said sleeve, being of such length as to fit within semi-circular apertures carried by the flanges 2, to which the outer end of said sleeve may be welded after the disks are assembled. The sleeve 11 is of such internal diameter as to receive therewithin the valve stem 12, with the cap 13 located within the outer portion of the sleeve 10. A cover plate 14 is shown as pivoted to the inner disk adjacent to the tube 10, said disk being adapted to be swung into and out of register with the sleeve 10, as occasion may require. The sleeve 10 will be of such diameter—about three inches—as will enable the operator conveniently to remove the valve cap 13, inflate the tire, and re-apply said cap.

It will be understood that the sleeves 3 and 4 will be applied to the disks before the welding of the flanges 7, for convenience of assembling.

While the wheel described herein is extremely simple in construction and economical of production, it is efficient in operation and, because of the manner of constructing the same, will permit the application to and removal therefrom of standard demountable rims and the inflation and deflation of pneumatic tires thereon without the admission of water or other rust-creating liquid or fluid to the interior thereof.

Having thus described my invention, what I claim is:—

1. A vehicle wheel comprising a pair of continuous opposed disks united at their peripheries to provide a fixed rim for a demountable tire carrying rim, the said disks each having a central opening with a hub sleeve extending through such openings and united thereto to form a fluid-tight connection therewith.

2. A vehicle wheel comprising a pair of continuous opposed disks united at their peripheries to provide a fixed rim for a demountable tire carrying rim, the said disks each having a central opening with a hub sleeve extending through such openings and united thereto to form a fluid-tight connections therewith, said disks being also provided within the peripheral portions thereof with registering openings, and sleeves mounted in said openings and each having a fluid-tight connection with said disks.

3. A vehicle wheel comprising a pair of continuous symmetrical disks, each having a central opening and a plurality of openings adjacent to but within the peripheral portion thereof and each having a peripheral flange and said flanges being homogeneously united to provide a fixed rim for a demountable tire carrying rim, a hub sleeve having shoulders adapted to engage the inner edges of the walls of the central openings of said disks and reduced extensions projecting through said openings and homogeneously united to the outer edges of the walls of said openings, and similarly constructed sleeves mounted in the peripheral openings of said disks and homogeneously united at their outer ends to said disks.

4. A vehicle wheel comprising a pair of continuous symmetrical disks, each having a central opening and a plurality of openings adjacent to but within the peripheral portion thereof and each having a peripheral flange and said flanges being united to provide a fixed rim for a demountable tire carrying rim, a hub sleeve having shoulders adapted to engage the inner edges of the walls of the central openings of said disks and reduced extensions projecting through said openings and united to the outer edges of the walls of said openings, and similarly constructed sleeves mounted in the peripheral openings of said disks and united at their outer ends to said disks.

5. In a vehicle wheel, the combination of a pair of opposed continuous disks having a fixed rim at their peripheries and having each a series of openings adjacent to and within their respective peripheries, the openings in one disk registering with those in the other, sleeves mounted in said openings and having each a fluid-tight connection with said disks, bolts mounted in said sleeves, and clamping members carried by said bolts for retaining a demountable rim upon the said fixed rim.

6. A wheel comprising a pair of symmetrical disks each having a peripheral flange, said flanges being united to provide a fixed rim, said disks having each a central opening with a hub sleeve extending through such openings and forming a fluid-tight connection therewith and with other openings adjacent to the peripheral portion thereof with sleeves mounted in said openings and each having a fluid-tight connection with said disks, and a sleeve extending transversely from one of said disks near the peripheral portion thereof and having a fluid-tight connection with said disk, and a sleeve projecting from the last mentioned sleeve and having a fluid-tight connection with the fixed rim.

7. In a wheel, the combination of a pair of symmetrical disks, each having a peripheral flange, said flanges being united to provide a fixed rim and said disks having a series of openings adjacent to and within their respective flanges, the openings in one disk registering with those in the other, sleeves mounted in said openings and having each a fluid tight connection with said disks, bolts mounted in said sleeves, clamping members carried by said bolts, and movable on the fixed rim to provide means for retaining a demountable rim thereupon, said disks having each a central opening, a hub sleeve extending between such central opening and forming a fluid-tight connection therewith, one of said disks also having an opening within the peripheral portion thereof, a sleeve secured to and forming a fluid-tight connection with such opening, and a sleeve extending radially from the last mentioned sleeve to the fixed rim, said rim having an opening registering with the last mentioned sleeve and having a fluid-tight connection therewith.

8. A wheel comprising a pair of symmetrical disks united to form a fixed rim, said rim having an opening therethrough and one of said disks having an opening within and adjacent to such rim opening, a sleeve secured to and having a fluid-tight connection with the opening in said disk and projecting into the space between said disks and having an opening presented towards the rim opening, and a sleeve extending between the last mentioned openings and forming a fluid-tight connection with the rim opening.

9. A wheel comprising a pair of symmetrical disks united to form a fixed rim, said rim having an opening therethrough and one of said disks having an opening within and adjacent to such rim opening, a sleeve secured to and having a fluid-tight connection with the opening in said disk and projecting into the space between said disks and having an opening presented towards the rim opening, a sleeve extending between the last mentioned openings and forming a fluid-tight connection with the rim opening, and a cover for the opening in said disk.

In testimony whereof, I hereunto affix my signature.

JOHN HARRIS.